US009410587B2

(12) United States Patent
Isono

(10) Patent No.: US 9,410,587 B2
(45) Date of Patent: Aug. 9, 2016

(54) FRICTION BRAKE DEVICE

(75) Inventor: Hiroshi Isono, Mishima (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/391,028

(22) PCT Filed: Apr. 7, 2012

(86) PCT No.: PCT/JP2012/059611
§ 371 (c)(1),
(2), (4) Date: Oct. 7, 2014

(87) PCT Pub. No.: WO2013/150659
PCT Pub. Date: Oct. 10, 2013

(65) Prior Publication Data
US 2015/0107942 A1    Apr. 23, 2015

(51) Int. Cl.
F16D 55/04    (2006.01)
F16D 55/40    (2006.01)
F16D 55/00    (2006.01)

(52) U.S. Cl.
CPC ........ F16D 55/40 (2013.01); *F16D 2055/0054* (2013.01); *F16D 2055/0058* (2013.01); *F16D 2055/0087* (2013.01)

(58) Field of Classification Search
CPC ............ F16D 55/40; F16D 2055/0087; F16D 2055/0054; F16D 2055/0058; F16D 65/092
USPC ........... 188/71.3, 72.2, 70 R, 70 B, 71.5, 72.4
See application file for complete search history.

(56) References Cited

U.S. PATENT DOCUMENTS

| 2,240,219 A * | 4/1941 | Lambert | ................ F16D 55/46 |
| | | | 188/152 |
| 5,796,192 A | 8/1998 | Riepl | |
| 5,911,292 A | 6/1999 | Schade et al. | |
| 6,397,980 B1 * | 6/2002 | Johnson | ................ F16D 55/10 |
| | | | 188/18 A |

(Continued)

FOREIGN PATENT DOCUMENTS

JP    52093857 A  *  8/1977
JP    8-121509        5/1996

(Continued)

OTHER PUBLICATIONS

International Search Report issued Jul. 17, 2012, in PCT/JP2012/059611, filed Apr. 7, 2012.

(Continued)

*Primary Examiner* — Thomas J Williams
*Assistant Examiner* — Mariano Sy
(74) *Attorney, Agent, or Firm* — Oblon, McClelland, Maier & Neustadt, L.L.P

(57) ABSTRACT

A friction brake device has a brake rotor including a disk part and a subsidiary rotor spaced apart from each other along a rotation axis and a cylindrical part integrally connecting their outer peripheral portions, brake pads which are rotatably supported around an autorotation axis parallel to the rotation axis between the disk part and the subsidiary rotor by a stationary member, rotational torque transmission devices which mutually transmit rotational torques between the brake rotor and the brake pads, and pressing devices which are supported between the disk part and the subsidiary rotor by the stationary member and press the brake pads against the disk part and the subsidiary rotor.

11 Claims, 3 Drawing Sheets

(56) References Cited

U.S. PATENT DOCUMENTS

| | | |
|---|---|---|
| 2012/0234121 A1 | 9/2012 | Jensen et al. |
| 2014/0166428 A1 | 6/2014 | Van Druten et al. |
| 2015/0060215 A1* | 3/2015 | Isono .................... F16D 65/092 188/72.2 |
| 2015/0075921 A1 | 3/2015 | Isono |
| 2015/0096856 A1* | 4/2015 | Isono ..................... F16D 51/62 188/70 B |
| 2015/0114767 A1 | 4/2015 | Isono |
| 2015/0114768 A1 | 4/2015 | Doleschel et al. |
| 2015/0129382 A1 | 5/2015 | Isono |

FOREIGN PATENT DOCUMENTS

| | | | |
|---|---|---|---|
| JP | 10169677 A | * | 6/1998 |
| JP | 2008-151199 A | | 7/2008 |
| JP | 2008151199 A | * | 7/2008 |
| JP | 2010-242841 | | 10/2010 |

OTHER PUBLICATIONS

U.S. Office Action mailed Dec. 21, 2015, in co-pending U.S. Appl. No. 14/391,084.

* cited by examiner

FRICTION BRAKE DEVICE

TECHNICAL FIELD

The present invention relates to a friction brake device and, more particularly, to a friction brake device which generates a friction force by pressing a friction member against a brake rotor.

BACKGROUND ART

As is described, for example, in the under-mentioned patent citation 1 which corresponds to an application filed by the same applicant as the present application, as one of friction brake devices, a friction brake device has been known which has a pair of friction members that are pressed against two sections of a brake rotor. In particular, in the brake device described in the above-mentioned patent citation 1, the friction members are pressed against the side surface of a disk part of the brake rotor and against the inner surface of a cylindrical part provided on the outer peripheral portion of the brake rotor.

In this type of brake device, a braking torque is generated by means of both friction engagement by the revolution of the friction members around the rotation axis relative to the disk part of the brake rotor and friction engagement by rotation of the friction members with the inner surface of the cylindrical part of the brake rotor. Accordingly, as compared to a brake device where the friction members are pressed only against the side surface of the disk part of the brake rotor, a higher braking torque can be generated.

CITATION LIST

Patent Literature 1: Japanese Patent Application Laid-open Publication No. H8-121509

SUMMARY OF INVENTION

Technical Problem

In the friction brake device described in the above-mentioned Laid-open Publication, the pair of friction members and the pair of pressing device which press the friction members are supported on both sides of the brake rotor by a caliper that bridges partially over the outer peripheral portion of the brake rotor. Each friction member is frictionally engaged with the inner surface of a cylindrical part provided on the outer peripheral portion of the brake rotor by being swung about a swinging axis caused by the friction force generated by the friction with the side surface of the disk part of the brake rotor.

Each friction member is to be able to swing about the swinging axis when the brake rotor rotates in either direction, which requires the caliper to have enough size to allow the friction members swing in both directions. As the reaction force of the pressing force by the pressing device acts on the caliper, the portions extending arcuately on both sides of the brake rotor are biased in the directions of separating them from each other. If the caliper is deformed by the basing force thus occurred, a braking force cannot effectively be generated. For that reason, the caliper should have enough strength and size to restrain itself from being deformed. Therefore, in the friction brake device described in the above-mentioned Laid-open Publication, in order to generate a higher braking force, the caliper should be increased in size. There still is a room in improving to generate higher braking force without requiring increasing the caliper in size.

A primary object of the present invention is to generate a higher braking force without requiring increasing in size the friction brake device in which friction members frictionally engage with the disk part and another section of the brake rotor to generate a braking torque.

Solution to Problem and Advantageous Effects

The present invention provides a friction brake device comprising a brake rotor which includes first and second disk parts spaced apart along a rotation axis and extending around the rotation axis over the entire circumference and a connection part integrally connecting the outer peripheral portions of the first and second disk parts; first and second rotating friction members which are supported between the first and second disk parts by a stationary member so that the rotating friction members can rotate about associated autorotation axes parallel to the rotation axis; first and second rotational torque transmission mechanisms which mutually transmit rotational torques between the brake rotor and the first and second rotating friction members without depending on the friction forces between the brake rotor and the first and second rotating friction members; and first and second pressing devices which are supported between the first and second disk parts by the stationary member and press the first and second rotating friction members against first and second mutually opposed friction surfaces of the first and second disk parts, respectively.

According to the configuration, a rotational torque of the brake rotor is transmitted to the first and second rotating friction members by the first and second rotational torque transmission mechanisms, and the first and second rotating friction members rotate about the associated autorotation axes. Accordingly, each rotating friction member revolutes around the rotation axis and auto-rotates about the autorotation axis frictionally engaging with the side surface of the associated disk part of the brake rotor, and a frictional torque generated by the autorotation about the autorotation axis is transmitted as a braking torque to the brake rotor by the associated rotational torque transmission mechanism. Therefore, the frictional brake device generates braking torques by means of the frictional engagements of the revolution and the autorotation, which enables to generate higher braking torque as compared to where a braking torque is generated only by means of the frictional engagement of the revolution.

A caliper is not required which partially bridges over the outer peripheral portion of the brake rotor to support a pair of friction members and pressing devices on both sides of the brake rotor and bears the reaction forces of the pressing forces by the pressing devices. The friction members do not swing, but rotate about the autorotation axis, which enables to reduce the space required for the friction members as compared to where the friction members swing. Therefore, a higher braking force can be generated without requiring increasing in size the friction brake device.

The first and second disk parts extend around the rotation axis over the entire circumference, which enables to make the rigidity of the brake rotor higher as compared to where a caliper is used which extends only partially around a rotation axis. Furthermore, the first and second pressing devices are disposed between the first and second disk parts together with the first and second rotating friction members, it is possible to simplify the structures of the conduits and the like required to actuate the pressing devices as compared to where the pressing devices and the rotating friction members are disposed on both sides of the brake rotor.

The above-mentioned configuration may be such that: the first and second pressing devices press the first and second rotating friction members against the first and second friction surfaces by way of first and second non-rotating friction members, respectively, which are supported non-rotatably around the rotation axis, and the first and second rotating friction members frictionally engage with the first and second friction surfaces, respectively, on one side and frictionally engage with the first and second non-rotating friction members, respectively, on the other side.

According to the configuration, each rotating friction member frictionally engages with the associated friction surface on one side thereof and frictionally engages with the associated non-rotating friction member on the other side thereof, and the friction torque generated by the latter frictional engagement is also transmitted to the brake rotor as a braking torque by the rotational torque transmission mechanism. Consequently, as compared to where each rotating friction member does not frictionally engage with the associated non-rotating friction member on the other side thereof, further higher braking torque can be generated.

The above-mentioned configuration may be such that: the connection part is higher in rigidity than the first and second disk parts.

According to the configuration, as compared to where the first and second disk parts is higher in rigidity than the connection part, it is possible to reduce the deformation of the first and second disk parts in the directions of separating them from each other due to the reaction forces of the pressing forces by the first and second pressing devices. Accordingly, as compared to where the magnitude relationship of the rigidity is reversed, a braking action of the brake device can be increased.

The above-mentioned configuration may be such that: the connection part is formed integrally with one of the first and second disk parts, and the other of the first and second disk parts is integrally coupled to the connection part by a coupling device which can release the coupling.

According to the configuration, in a situation where the coupling of the coupling device is released, the first and second rotating friction members and the first and second pressing devices can be assembled to one of the first and second disk parts and the associated non-rotating friction members. The brake rotor can be disassembled by releasing the coupling of the coupling device and an access can be made to the first and second rotating friction members and the first and second pressing devices. Consequently, as compared to where the first and second disk parts and the connection part are integrally formed so as to be a one unit, assembly and maintenance of the brake device can easily be performed.

The above-mentioned configuration may be such that: the first and second pressing devices include a cylinder bore formed in the stationary member and extending in a direction across the first and second disk parts and first and second pistons mating with the cylinder bore, and the first and second pistons cooperate with the cylinder bore to define a common cylinder chamber.

According to the configuration, as compared to where first and second pistons mate with associated cylinder bores, the number of cylinder bores can be reduced and the numbers of passages and the like for controlling the pressures in the cylinder chambers can be reduced in number. It is possible to make it unnecessary to bear the reaction forces of the pressing forces exerted on disk parts by the pressures in the cylinder chambers by means of the non-rotating friction members. Consequently, as compared to where first and second pistons mate with associated cylinder bores, the structure of the brake device can be simplified.

In addition, as compared to where first and second pistons mate with associated cylinder bores, the first and second rotating friction members and the first and second pressing devices can be arranged more in number around the rotation axis. By increasing the rotating friction members and the pressing devices in number while reducing the size thereof, the brake device can be downsized and the braking action of the brake device can be enhanced.

The above-mentioned configuration may be such that: the brake rotor cooperates with the stationary member to define a closed space which accommodates the first and second rotating friction members, the first and second pressing devices and the first and second non-rotating friction members.

According to the configuration, the first and second rotating friction members and the first and second pressing devices are accommodated in the closed chamber, which enables to reduce the risk that muddy water and dust may enter around the rotating friction members and the pressing devices, thereby to enhance the durability of the brake device. It is possible to eliminate the need for a cover which restrains muddy water and dust from entering around the rotating friction members and the pressing devices The above-mentioned configuration may be such that: the closed space is filled with a lubricant.

According to the configuration, the frictional engagement areas between the first and second disk parts and the first and second rotating friction members can be lubricated by the lubricant. Consequently, abnormal abrasion of the disk parts and the rotating friction members can be restrained from occurring; heat generation and brake squeal by friction can be restrained from being caused; and the temperature rising of the disk parts and the rotating friction members can be restrained from occurring by means of cooling of the disk parts and the rotating friction members by the lubricant.

The above-mentioned configuration may be such that: the first and second rotating friction members frictionally engage with the first and second friction surfaces, respectively, on one side and frictionally engage with the first and second non-rotating friction members, respectively, on the other side, and the distances from the autorotation axes of the rotating friction members to the centers of the frictional engagement areas on the opposite side surfaces are equal to each other.

The above-mentioned configuration may be such that: the first and second rotating friction members have shaft parts and supported rotatably around the autorotation axes by the stationary member, and frictionally engage with the first and second friction surfaces, respectively, on one side and frictionally engage with the first and second non-rotating friction members, respectively, at the shaft parts on the other side.

MODE FOR CARRYING OUT THE INVENTION

The present invention will now be described in detail with respect to preferred embodiments by referring to the accompanying drawings.

First Embodiment

Figure 1:
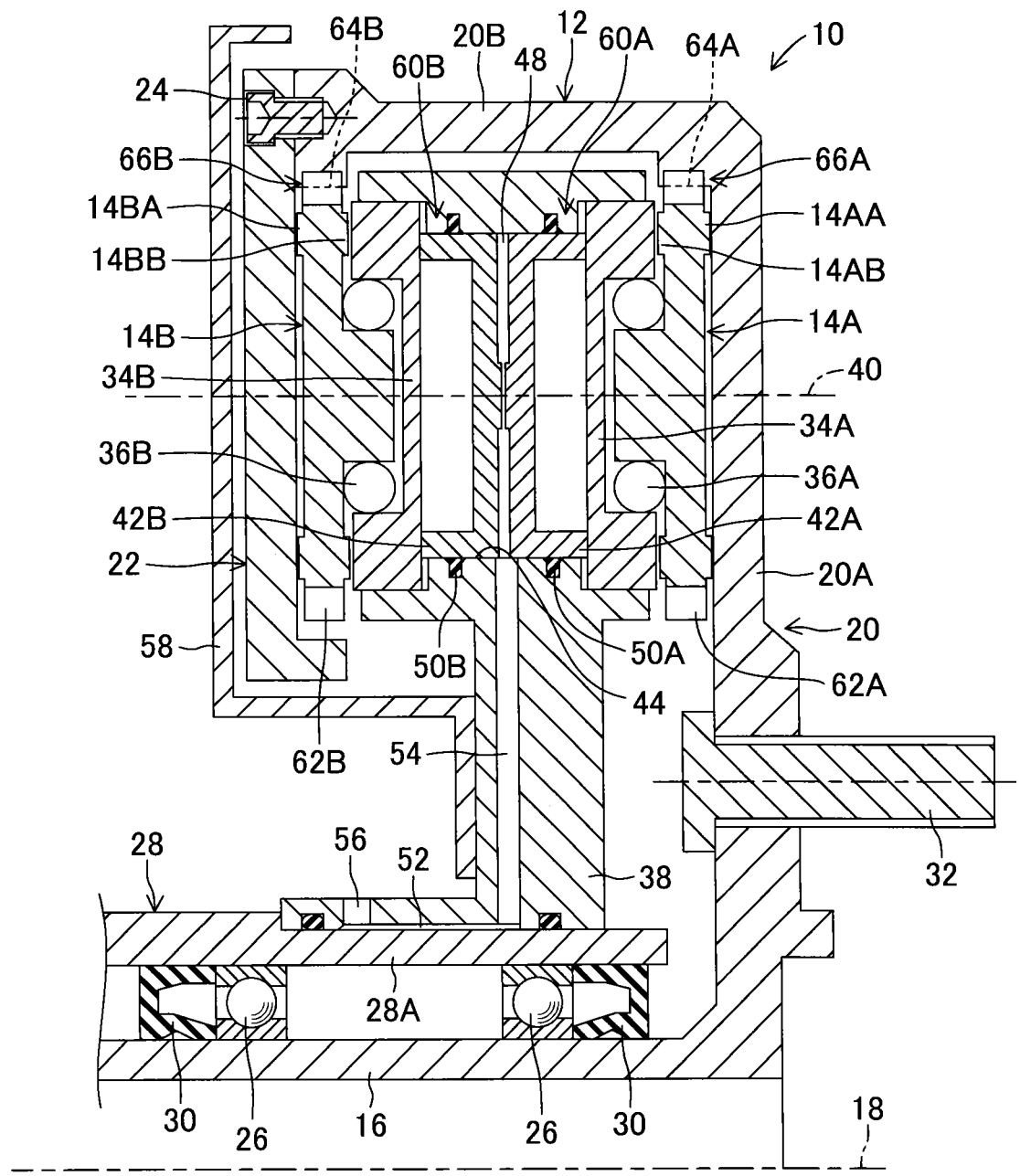
FIG. 1 is a sectional view showing a section of a first embodiment of the friction brake device according to the present invention which is adapted to be a brake device for a vehicle, as cut along a section passing through a rotation axis.

FIG. 1 is a sectional view showing a section of a first embodiment of the friction brake device according to the present invention which is adapted to be a brake device for a vehicle, as cut along a section passing through a rotation axis.

In FIG. 1, 10 denotes a whole of the brake device. The brake device 10 has a brake rotor 12 and brake pads 14A and 14B which act as first and second friction members, respectively. The brake rotor 12 rotates around a rotation axis 18 together with a rotating shaft 16 of a vehicle wheel, not shown. In particular, in the illustrated embodiment, the brake rotor 12 has a main rotor 20 which is integral with the rotating shaft 16 and a subsidiary rotor 22 which rotates integrally with the main rotor. The main rotor 20 and the subsidiary rotor 22 are made from the same metal.

The main rotor 20 has a disk part 20A and a cylindrical part 20B which are spaced apart from each other along the rotation axis 18. The disk part 20A is integrally connected at the inner peripheral portion to the rotating shaft 16 and extends like an annular plate perpendicularly to and around the rotation axis 18. The cylindrical part 20B is integrally connected to the outer peripheral portion of the disk part 20A and extends cylindrically around the rotation axis 18. The subsidiary rotor 22 extends like an annular plate perpendicularly to and around the rotation axis 18 and is coupled at the outer peripheral portion to an end of the cylindrical part 20B opposite to the disk part 20A by a plurality of bolts 24.

It is to be noted that the disk part 20A and the subsidiary rotor 22 have the same thickness and the thickness of the cylindrical part 20B is smaller than those of the disk part 20A and the subsidiary rotor 22. However, since the cylindrical part 20B extends cylindrically around the rotation axis 18, it has a rigidity higher than those of the disk part 20A and the subsidiary rotor 22.

Thus, the disk part 20A and the subsidiary rotor 22 serve as first and second disk parts, respectively, which extend perpendicularly to and around the rotation axis 18 and are spaced apart along the rotation axis 18. The cylindrical part 20B serves as a connection part which cooperates with the bolts 24 to integrally connect the outer peripheral portions of the disk part 20A and the subsidiary rotor 22. The disk part 20A, the cylindrical part 20B and the subsidiary rotor 22 form a staple-like sectional shape which opens radially inwardly as viewed in a radial section passing through the rotation axis 18. The opposed surfaces of the disk part 20A and the subsidiary rotor 22 define first and second friction surfaces which extend perpendicularly to the rotation axis 18 around the rotation axis 18 and are parallel to each other.

The rotating shaft 16 is rotatably supported around the rotation axis 18 by a sleeve part 28A of a wheel carrier member 28 through a pair of ball bearings 26. The space defined by the pair of ball bearings 26, the rotating shaft 16 and the sleeve part 28A is filled with lubricant such as grease. A pair of seal members 30 are arranged on both sides in axial direction of the pair of ball bearings 26 and seal the space between the rotating shaft 16 and the sleeve part 28A so that dust and muddy water do not enter the ball bearings 26.

Although not shown in the figure, the disk part 20A of the main rotor 20 is adapted to be integrally coupled to a rim part of the vehicle wheel by four bolts and nuts 32 screwed thereto, which are spaced apart by 90 degrees around the rotation axis 18. Consequently, the rotating shaft 16 and the brake rotor 12 (the main rotor 20 and the subsidiary rotor 22) rotate around the rotation axis 18 together with the wheel.

The brake pads 14A and 14B are arranged between the disk part 20A and the subsidiary rotor 22 and have the same shape and size to each other. The brake pads 14A and 14B each have a circular disk part and a shaft part which are aligned with each other. The disk parts are positioned on the sides of the disk part 20A and the subsidiary rotor 22. The disk part of the brake pad 14A has frictional portions 14AA and 14AB on the opposite sides of its outer peripheral portion and the disk part of the brake pad 14B has frictional portions 14BA and 14BB on the opposite sides of its outer peripheral portion. Each frictional portion bulges from the associated side surface of the disk part and extends as an annular strip around the axis of the associated brake pad.

It is to be noted that the brake pads 14A and 14B may be produced by, for example, powder metallurgy so that the frictional portions are integrally formed with the associated disk parts. Alternatively, the frictional portions may be formed by adhering annular strips made from frictional material to the side surfaces of a disk part by means of adhesive or other means. Furthermore, although the frictional portions 14AA to 14BB are made from the same friction material, they may be made from different friction materials from each other.

The shaft parts of the brake pads 14A and 14B are rotatably supported by non-rotational engagement members 34A and 34B, respectively, via a plurality of balls 36A and 36B. The non-rotational engagement members 34A and 34B have cylindrical parts which encircle the shaft parts of the brake pads 14A and 14B, respectively, and disk parts which are formed integrally to the ends of cylindrical parts opposite to the associated brake pads, but the disk parts may be omitted.

The cylindrical parts of the non-rotational engagement members 34A and 34B are supported by a stationary member 38 serving as a non-rotational member so that the engagement members can displace relative to the stationary member 38 along an autorotation axis (spin axis) 40 parallel to the rotation axis 18 but cannot rotate about the autorotation axis 40. Consequently, the brake pads 14A and 14B are supported so that they can displace relative to the disk part 20A and the subsidiary rotor 22 along the autorotation axis 40 and can rotate about the autorotation axis 40. Notably, prevention of the non-rotational engagement members from rotating may be achieved by providing the combination of a key and a key groove that extend along the autorotation axis 40 or planer surfaces engaging with each other which are provided on the parts of the surface of the shaft part and the inner surface of the cylindrical part.

Pistons 42A and 42B each having a cylindrical shape with a bottom are secured at their opening ends to the opposed side surfaces of the disk parts of the non-rotational engagement members 34A and 34B. The pistons 42A and 42B are aligned with the axes of the brake pads 14A and 14B, respectively. The stationary member 38 has a cylinder bore 44 having a circular sectional shape and extending along the autorotation axis 40 between the non-rotational engagement members 34A and 34B. The pistons 42A and 42B mate with the cylinder bore 44 so as to reciprocate along the autorotation axis 40 and cooperate with each other to define a cylinder chamber 48. O-ring seals 50A and 50B are inserted into ring grooves formed in the surface of the cylinder bore 44 and the O-ring seals seal the clearance between the pistons 42A and 42B and the cylinder bore 44.

It is to be noted that although only one each of the brake pads 14A and 14B, the pistons 42A and 42B, and the cylinder chamber 48 are shown in FIG. 1, they may be provided in a plurality while being equally spaced apart around the rotation axis 18.

The stationary member 38 has an annular groove 52 extending around the rotation axis 18 in the inner surface of its inner peripheral portion. The annular groove 52 is communicatingly connected with the cylinder chamber 48 by internal passages 54 extending in a radial direction. The annular groove 52 is also connected with a hydraulic brake actuator by way of a communicating hole 56 formed in the inner peripheral portion of the stationary member 38 and a conduit, not shown in the figure. A cover member 58 is secured by screws to the side surface of the stationary member 38 at positions radially outward of the inner cylindrical part. The cover member 58 covers the subsidiary rotor 22 while being spaced apart therefrom so as to prevent dust and muddy water from entering into the space between the brake rotor 12 and the stationary member 38.

As is apparent from the above descriptions, upon the hydraulic pressure in the cylinder chamber 48 is increased, the brake pads 14A and 14B, the non-rotational engagement members 34A and 34B, and the pistons 42A and 42B are moved in directions separating them from each other, which makes the brake pads 14A and 14B be pressed against the friction surfaces of the disk part 20A and the subsidiary rotor 22. Consequently, the pistons 42A and 42B, the cylinder bore 44 and the like function as first and second pressing devices 60A and 60B which are supported by the stationary member 38 and press the brake pads 14A and 14B against the disk part 20A and the subsidiary rotor 22 via the non-rotational engagement members 34A and 34B, respectively.

The brake pads 14A and 14B are provided with external gears 62A and 62B, respectively, on the outer peripheral portions of the disk parts thereof. The external gears 62A and 62B mesh with internal gears 64A and 64B, respectively, formed on the cylindrical part 20B of the main rotor 20. The external gears 62A, 62B and the internal gears 64A, 64B function as rotational torque transmission devices 66A and 66B, respectively, which transmit rotational torques mutually between the brake rotor 12 and the brake pads 14A and 14B without relying on the frictional forces therebetween.

Upon the wheel, not shown in the figure, is rotated, the brake rotor 12 and the rotating shaft 16 rotate around the rotation axis 18 together with the wheel, but the brake pads 14A and 14B, the sleeve part 28A, the stationary member 38, and the cover member 58 do not rotate. Consequently, the disk part 20A and the subsidiary rotor 22 rotates relative to the brake pads 14A and 14B around the rotation axis 18. The rotational torques of the disk part 20A and the subsidiary rotor 22 are transformed into rotational torques about the autorotation axis 40 and transmitted to the brake pads 14A and 14B by the rotational torque transmission devices 66A and 66B. As a result, the brake pads 14A and 14B revolve relative to the disk part 20A and the subsidiary rotor 22 around the rotation axis 18 while rotating about the autorotation axis 40, and revolve relative to the non-rotational engagement members 34A and 34B around the rotation axis 18.

Accordingly, upon the brake pads 14A and 14B are pressed by the pressing devices 60A and 60B, the frictional portions on the both sides of the brake pads 14A and 14B frictionally engage with the disk part 20A and the subsidiary rotor 22 and with the non-rotational engagement members 34A and 34B, respectively, and thereby generate frictional forces. Consequently, in addition to a braking torque Trv generated by the revolution of the brake pads 14A and 14B, a braking torque Trt is generated by the rotation of the brake pads, and the braking torque Tb of the brake device assumes the sum of these torques.

The braking torques Trv and Trt are proportional to the pressing forces by the pressing devices 60A and 60B afforded to the brake pads 14A and 14B, and the pressing forces are proportional to the hydraulic pressure in the cylinder chamber 48. Accordingly, the braking torque Tb, i.e., the braking force that the brake device 10 generates can be controlled by controlling the pressing forces through the control of the hydraulic pressure in the cylinder chamber 48.

As described above, the braking torque Tb of the brake device is the sum of the braking torques Trv generated by the revolution and the braking torques Trt generated by the rotation. As the braking torques Trt generated by the rotation are generated on both side surfaces of the two brake pads, they are twice the braking torques Trt' generated by the brake device described in the above-mentioned Laid-Open Publication in which the braking torque generated by the rotation is generated only on one side surface.

Therefore, a braking torque can be generated which is far higher than the braking torque generated by a conventional general brake device which generates only a braking torques Trv. A braking torque can be generated which is higher than the braking torque generated by the brake device described in the above-mentioned Laid-Open Publication.

For example, although not shown in FIG. 1, assume that the distances between the rotation axis 18 and the rotational torque transmission devices 66A and 66B are 152.5 mm; the distance between the rotation axis 18 and the autorotation axis 40 is 120 mm; and the distances between the autorotation axis 40 and the rotational torque transmission devices 66A and 66B are 25 mm. Further, assume that the friction coefficient of the frictional contact areas is μ and the pressing force by the pressing devices 60A and 60B are F kgf. A resistance torque Tst about the autorotation axis 40 generated by the rotation of the brake pads 14A and 14B is the sum of the resistance torques generated by the rotation of the two brake pads and is expressed by the following formula 1.

$$Tst = 2 \times 2 \times 25 \times \mu \times F \quad (1)$$
$$= 100 \, \mu F$$

The resistance torque Tst is transformed into a rotational torque about the rotation axis 18 by the rotational torque transmission devices 66A and 66B and is transmitted to the brake rotor 12 as a braking torque Trt by the rotation. As the distances between the autorotation axis 40 and the rotational torque transmission devices 66A and 66B are 25 mm, the braking torque Trt by the rotation is expressed by the following formula 2.

$$Trt = 100 \, \mu F / 32.5 \times 152.5 \quad (2)$$
$$= 469 \, \mu F$$

The braking torque Trv generated by the revolutions may be considered to be generated by the frictional forces which the brake pads 14A and 14B generate at their one side surface under situations where the pressing force F is exerted by the pressing devices 60A and 60B along the autorotation axis 40, and is expressed by the following formula 3.

$$Trv = 2 \times 120 \ \mu F \qquad (3)$$
$$= 240 \ \mu F$$

Accordingly, the braking torque Tb which is the sum of the braking torque Trv and the braking torque Trt by the rotation is expressed by the following formula 4. A servo ratio Rbt1 of the braking torque in relation to a conventional general brake device which can generate the braking torque Trv only is expressed by the following formula 5.

$$Tb = 469 \ \mu F + 240 \ \mu F \qquad (4)$$
$$= 709 \ \mu F$$

$$Rbt1 = 709 \ \mu F/240 \ \mu F \qquad (5)$$
$$= 2.95$$

Assume that in the brake device described in the above-mentioned Laid-Open Publication, each brake pad is pressed at μF/2 against the inner surface of the cylindrical part of the brake rotor by a friction force μF acting between the brake pad and the side surface of the brake rotor. In addition, assume that the distance from the rotation axis of the brake rotor to the inner surface of the cylindrical part is 152.5 mm. The braking torque Trv' generated by the frictional engagement between the brake pads and the inner surface of the cylindrical part of the brake rotor is expressed by the following formula 6.

$$Trv' = 2 \times \mu F/2 \times 152.5 \qquad (6)$$
$$= 152.5 \ \mu F$$

Accordingly, a servo ratio Rbt2 of the braking torque in relation to the brake device described in the above-mentioned Laid-Open Publication is expressed by the following formula 7.

$$Rbt2 = 709 \ \mu F/(240 \ \mu F + 152.5 \ \mu F) \qquad (7)$$
$$= 1.8$$

Thus, according to the first embodiment, in the above-described specification, it is possible to generate a braking torque which is approximately three times as that generated by a conventional general brake device and which is approximately 1.8 times as that generated by the brake device described in the above-mentioned Laid-Open Publication.

It is to be understood that in the embodiment, if the number of the brake pads and the like is N (a positive integer), the braking torque Tb assumes N times as that expressed by the formula 5. Thus, further higher braking torque can be generated and the servo ratios Rbt1 and Rbt2 can further be increased. The same goes with the under-described third embodiment.

Second Embodiment

Figure 2:
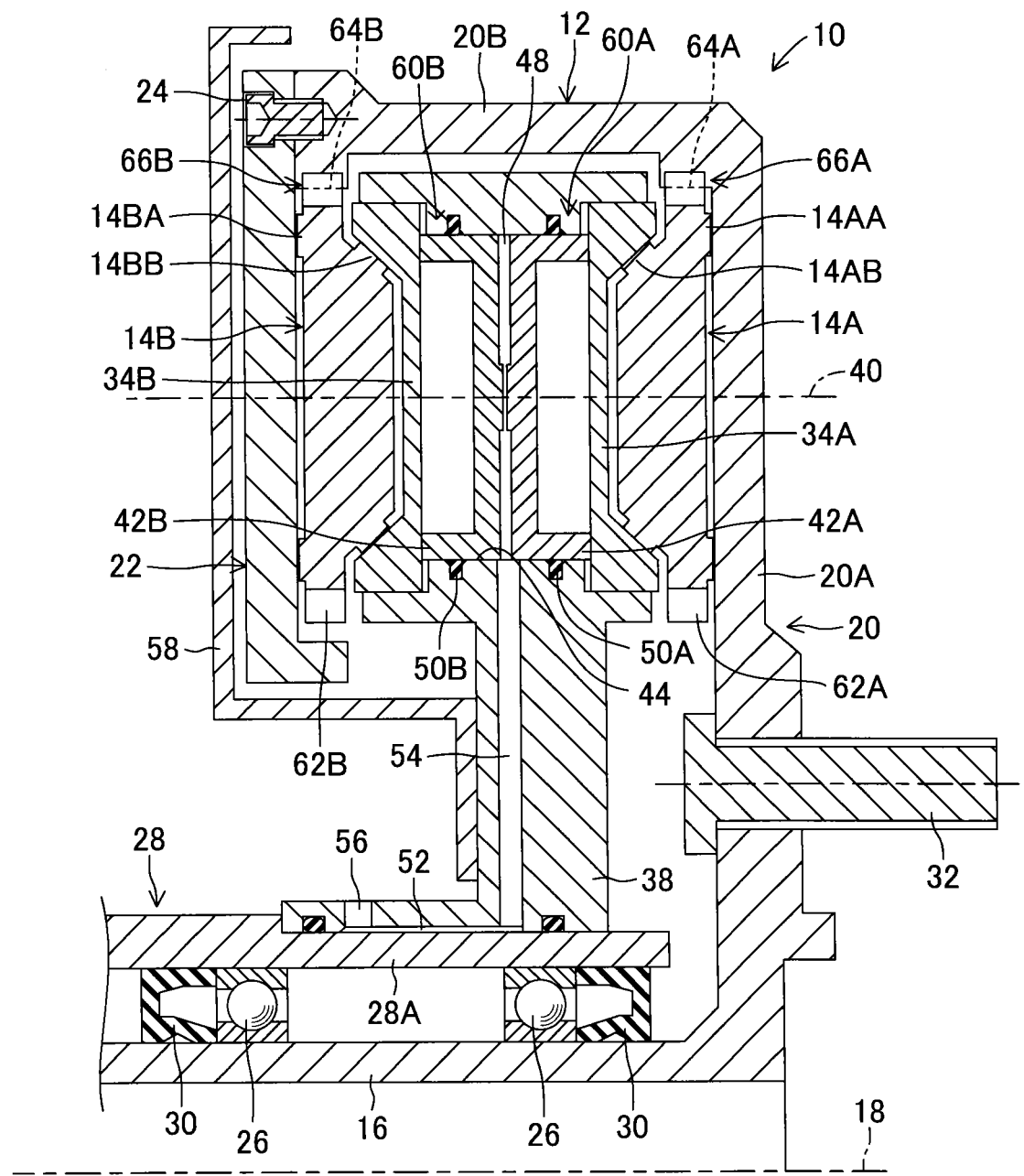
FIG. 2 is a sectional view showing a section of a second embodiment of the friction brake device according to the present invention which is structured as a modified example of the first embodiment, as cut along a section passing through a rotation axis.

FIG. 2 is a sectional view showing a section of a second embodiment of the friction brake device according to the present invention which is structured as a modified example of the first embodiment, as cut along a section passing through a rotation axis. In FIG. 2, the same members as those shown in FIG. 1 are denoted by the same reference numbers as in FIG. 1. The same goes in the under-described third embodiment.

In the second embodiment, the shaft parts of the brake pads 14A and 14B are larger in diameter than those in the first embodiment, and each has a truncated conical shape which has a diameter becoming smaller as the position leaves from the disk part. The inner surfaces of the cylindrical parts of the non-rotational engagement members 34A and 34B have truncated conical shapes corresponding the shapes of the shaft parts of the brake pads 14A and 14B, respectively. The frictional portions 14AB and 14BB are not provided on the disk parts, but are provided on the shaft parts.

No ball is interposed between the shaft parts of the brake pads and the cylindrical parts of the non-rotational engagement members which corresponds to the balls 36A and 36B in the first embodiment. The end faces of the cylindrical parts of the non-rotational engagement members 34A and 34B are spaced apart from the disk parts of the brake pads 14A and 14B. It is to be noted that the truncated conical surfaces of the cylindrical parts of the non-rotational engagement members and the shaft parts of the brake pads are co-axial with the autorotation axis 40, and are inclined 45 degrees relative to the autorotation axis 40. The inclination angle may be another value.

As will be apparent from comparing FIG. 2 with FIG. 1, the second embodiment is structured in other aspects similarly to the above-described first embodiment. Thus, except that the non-rotational engagement members 34A and 34B support the shaft parts of the brake pads 14A and 14B at their truncated conical surfaces and frictionally engage with the frictional portions 14AB and 14BB, the second embodiment operates similarly to the first embodiment. Consequently, advantageous effects similar to those in the first embodiment can be achieved.

In particular, when the non-rotational engagement members 34A and 34B are pressed with the pressing forces F by the pressing devices 60A and 60B, respectively, the forces with which the non-rotational engagement members 34A and 34B press the brake pads 14A and 14B, respectively, at their truncated conical surfaces become $F/2^{1/2}$. However, the non-rotational engagement members 34A and 34B press the brake pads 14A and 14B against the disk part 20A and the subsidiary rotor 22, respectively, with a pressing force of F along the autorotation axis 40. Assume that the distances between the autorotation axis 40 and the brake pads 14A and 14B are 23 mm and the other specifications of the brake device 10 are the same as those of the first embodiment. Then, the resistance torque Tst acting about the autorotation axis 40 which is generated by the autorotation of the brake pads 14A and 14B is expressed by the following formula 8.

$$Tst = 2 \times 25 \times \mu \times F + 2 \times 23 \times \mu \times F \qquad (8)$$
$$= 96 \ \mu F$$

As the braking torque Trt generated by the autorotation of the brake pads is expressed by the following formula 9, the braking torque Tb which is the sum of the braking torque Trv and the braking torque Trt by the autorotation is expressed by the following formula 10.

$$Trt = 96 \ \mu F/32.5 \times 152.5 \qquad (9)$$
$$\approx 450 \ \mu F$$

$$Tb = 450 \ \mu F + 240 \ \mu F \qquad (10)$$
$$= 690 \ \mu F$$

A servo ratios Rbt1 and Rbt2 of the braking torque in relation to a conventional general brake device and the brake device described in the above-mentioned Laid-Open Publication, respectively, are expressed by the following formulae 11 and 12.

$$Rbt1 = 690 \ \mu F/240 \ \mu F \qquad (11)$$
$$= 2.88$$

$$Rbt2 = 690 \ \mu F/(240 \ \mu F + 152.5 \ \mu F) \qquad (12)$$
$$\approx 1.76$$

Thus, according to the second embodiment, the brake device can generate a braking torque which is much higher than that generated by a conventional general brake device and which is higher than that generated by the brake device described in the above-mentioned Laid-Open Publication.

It is to be understood that if the number of the brake pads and the like is N (a positive integer), the braking torque Tb assumes N times as that expressed by the formula 10. Thus, in the second embodiment, further higher braking torque can be generated and the servo ratios Rbt1 and Rbt2 can further be increased.

In particular, according to the second embodiment, a plurality of balls need not to be interposed between the shaft parts of the brake pads 14A, 14B and the cylindrical parts of the non-rotational engagement members 34A, 34B. Consequently, as compared to the first embodiment, the structure of the brake device can be simplified, and assembly and disassembly for maintenance can more easily be performed.

Third Embodiment

Figure 3:
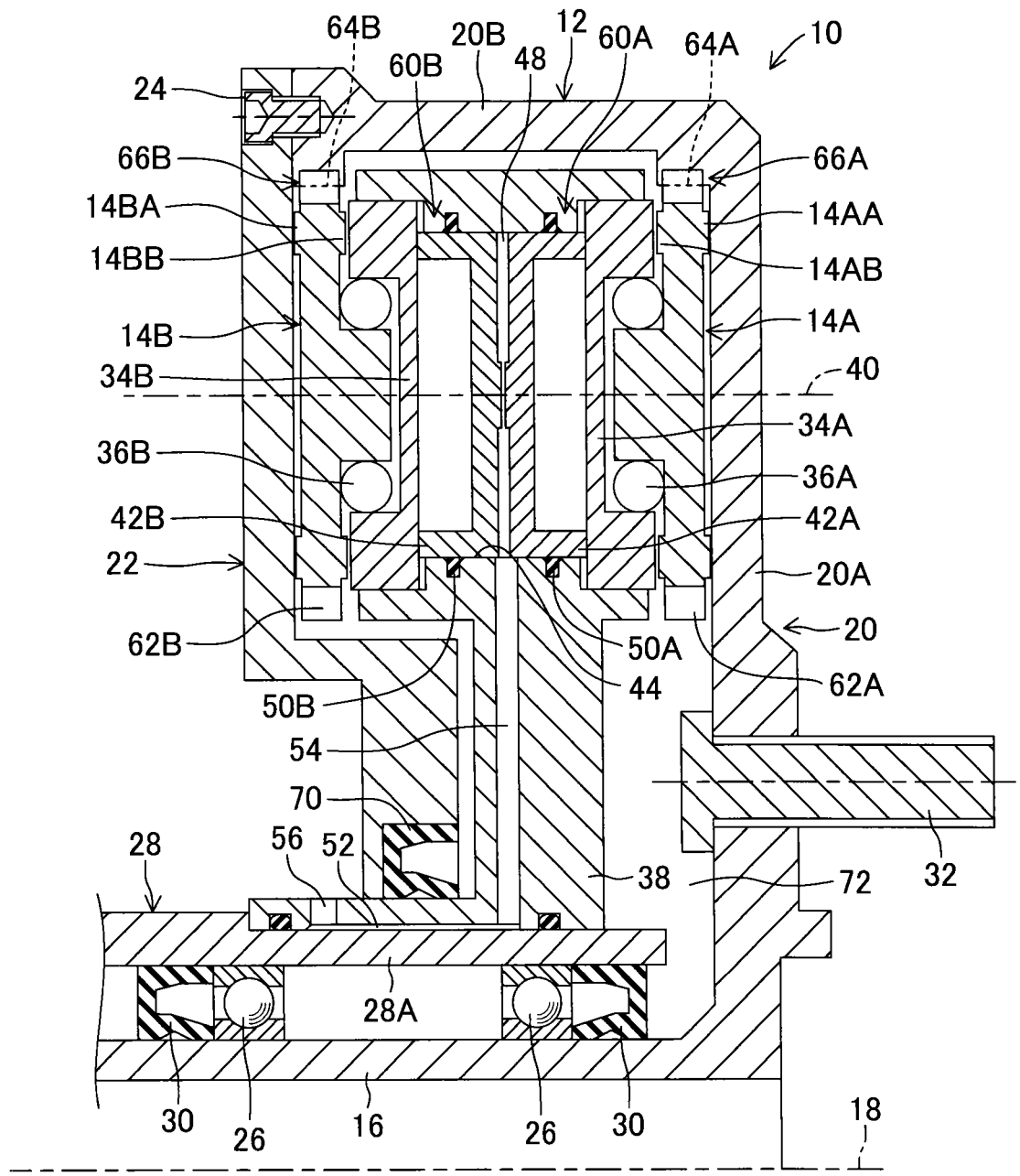
FIG. 3 is a sectional view showing a section of a third embodiment of the friction brake device according to the present invention which is structured as a modified example of the first embodiment, as cut along a section passing through a rotation axis.

FIG. 3 is a sectional view showing a section of a third embodiment of the friction brake device according to the present invention which is structured as a modified example of the first embodiment, as cut along a section passing through a rotation axis.

In the third embodiment, the main rotor 20 is the same as in the first and second embodiments but the inner peripheral portion of the subsidiary rotor 22 mates with the cylindrical inner peripheral portion of the stationary member 38. A seal member 70 extending around the rotation axis 18 over the entire circumference is disposed between the inner peripheral portion of the subsidiary rotor 22 and the cylindrical inner peripheral portion of the stationary member 38.

Thus, the main rotor 20 and the subsidiary rotor 22 cooperate with the rotating shaft 16, the wheel carrier member 28, the seal member 70 and the stationary member 38 to define a closed chamber 72, and the brake pads 14A, 14B and the principal portion of the stationary member 38 are accommodated in the closed chamber 72. The closed chamber 72 is filled with a lubricant. Notably, no cover is provided which corresponds to the cover 52 in the first and second embodiment.

As will be apparent from comparing FIG. 3 with FIG. 1, the third embodiment is structured in other aspects similar to the above-described first embodiment. Thus, the third embodiment operates similarly to the first embodiment and the servo ratios Rbt1 and Rbt2 are the same as those in the first embodiment.

In particular, according to the third embodiment, the brake rotor 12 cooperates with the stationary member 38 serving a non-rotating member to define the closed chamber 72 which accommodates the brake pads 14A, 14B and the pressing devices corresponding thereto.

Consequently, a risk can be reduced that muddy water and dust may enter into the space between the brake pads 14A, 14B and the disk part 20A and the subsidiary rotor 22 and/or the pressing device, which enables to enhance the durability of the brake device 10. The necessity of the cover or the like for restraining muddy water and dust from entering into the brake device 10 can be eliminated.

According to the third embodiment, the closed space is filled with a lubricant. Accordingly, the frictional contact areas between the brake pads 14A, 14B and the disk part 20A and the subsidiary rotor 22 can be lubricated by the lubricant. Therefore, abnormal abrasion of the members can be restrained from occurring; heat generation and brake squeal by friction can be restrained from being caused; and the temperature rising of the members can be restrained from occurring by means of cooling of the brake pads and the like by the lubricant.

According to the first to third embodiments, the disk part 20A, the cylindrical part 20B and the subsidiary rotor 22 form a staple-like sectional shape which opens radially inwardly as viewed in a radial section passing through the rotation axis 18. The pressing devices formed by pistons 42A and 42B and the like are provided between the disk part 20A and the subsidiary rotor 22 together with the brake pads 14A and 14B, and are adapted to press the brake pads 14A and 14B against the disk part and the subsidiary rotor in the directions of separating them from each other.

Consequently, a caliper is not required which supports the pair of friction members and the pressing devices and bears the reaction forces of the pressing forces generated by the pressing devices on the opposite sides of the brake rotor as in a conventional disk type brake device and the brake device described in the above-mentioned Laid-Open Publication. No enhancement of the caliper in rigidity is required. Since the disk part 20A and the subsidiary rotor 22 which serve as the first and second disk parts, respectively, extend around the rotation axis 18 over the entire circumference, the brake rotor 12 can be enhanced in rigidity as compared to a caliper which extend only in an arc shape around the rotation axis.

The pressing forces generated by the pressing devices formed by pistons 42A and 42B and the like are controlled by means of controlling the hydraulic pressure in the cylinder chamber 48 and the latter is formed in the stationary member 38 positioned between the disk part 20A and the subsidiary rotor 22. The hydraulic pressure is controlled by way of the internal passages 54 formed in the stationary member 38.

Accordingly, conduits and the like can be made unnecessary which are connected with the pressing devices for actuating the same in a brake device where pressing devices are positioned outside the brake rotor as in a conventional disk type brake device and the brake device described in the above-mentioned Laid-Open Publication.

Therefore, according to the above-described embodiments, as compared to a conventional disk type brake device and the brake device described in the above-mentioned Laid-Open Publication, while restraining increase in size, a braking force generated by the friction brake device can be increased.

In particular, according to the first and third embodiments, the brake pads 14A and 14B frictionally engage with the disk part 20A and the like on the both side surfaces of their disk parts at the same radial position, which enables to efficiently transmit the pressing forces by the pressing devices 60A and 60B so that the pressing forces on both side surfaces become the same to each other. As compared to where the frictional engagement with the disk part 20A and the like takes place at a radial position on one side surface and at another radial position on the other side surface of the disk parts of the brake pads 14A and 14B, deforming stress acting on the brake pads can be reduced.

According to the above-described embodiments, the pistons 42A and 42B mate with the cylinder bore 44 to define the common cylinder chamber 48 therebetween and reciprocate along the axis 40 parallel with the rotation axis 18. Accordingly, as compared to where the pistons 42A and 42B mates with the associated cylinder bores, it is possible to reduce the number of the cylinder bores and the number of the internal passages 54 and the like for controlling the pressure in the cylinder chamber. The stationary member 38 does not need to bear the reaction forces of the pressing forces exerted by the pressure in the cylinder chamber 48 against the disk part 20A and the subsidiary rotor 22. Accordingly, the structure of the brake device 10 can be simplified as compared to where the pistons 42A and 42B mates with the associated cylinder bores.

According to the above-described embodiments, the thickness of the cylindrical part 20B is smaller than those of the disk part 20A and the subsidiary rotor 22. However, the cylindrical part 20B extends cylindrically around the rotation axis 18 and it has a rigidity higher than those of the disk part 20A and the subsidiary rotor 22.

Consequently, as compared to where the cylindrical part 20B has a rigidity lower than those of the disk part 20A and the subsidiary rotor 22, it is possible to reduce the deformation amount by which the disk part 20A and the subsidiary rotor 22 deform in the direction of separating them from each other during the operation of the brake device 10. Therefore, as compared to where the magnitude relation of the rigidities is reversed, the braking action of the brake device 10 can be enhanced.

In addition, according to the above-described embodiments, the main rotor 20 and the subsidiary rotor 22 form a staple-like sectional shape which opens radially inwardly as viewed in a radial section passing through the rotation axis 18. The stationary member 38 which supports the pressing devices consisting of the brake pads 14A, 14B, the pistons 42A, 42B and the like is supported at its inner peripheral portion by the wheel carrier member 28 and extends into the space between the disk part 20A and the subsidiary rotor 22 from the radially inward position.

Consequently, as compared to where the main rotor 20 and the subsidiary rotor 22 form a staple-like sectional shape which opens in a direction other than the radially inward direction, the structure of the stationary member 38 can be simplified, which enables to simplify in structure and downsize the brake device 10.

Further, according to the above-described embodiments, the cylindrical part 20B is integral with the disk part 20A, and the cylindrical part 20B and the disk part 20A form the main rotor 20 to which a rim part of a vehicle wheel is coupled.

Consequently, as compared to where the cylindrical part 20B is a part of the subsidiary rotor 22 and the cylindrical part 20B is coupled to a main rotor having a substantially disk shape, it is possible to enhance the rigidity of the brake rotor 12 and to enhance the attachment strength of the brake device 10 coupled to a rim part of a vehicle wheel.

While the present invention has been described with reference to the above embodiments, it will be apparent to those skilled in the art that the present invention is not limited thereto, but may be embodied in various other forms without departing from the scope of the invention.

For example, in the above-described embodiments, the rotational torque transmission devices 66A and 66B are defined by the internal gears formed on the brake rotor 12 and the external gears formed on the brake pads 14A and 14B. However, the gears formed on the brake rotor 12 may be external gears formed on the radially inner side of the brake pads 14A and 14B. The rotational torque transmission device may be configured in any structure so long as it can transmit the rotational torque between the brake rotor 12 and the brake pads 14A and 14B to each other.

According to the above-described embodiments, the pistons 42A and 42B mate with the cylinder bore 44 to define the common cylinder chamber 48 therebetween and reciprocate along the axis 46 parallel with the rotation axis 18. However, the pistons 42A and 42B may mate with respective cylinder bores.

The brake pads 14A, 14B, the non-rotational engagement members 34A, 34B and the pistons 42A, 42B are disposed in alignment with the autorotation axis 40. The brake pad 14A, the non-rotational engagement member 34A and the piston 42A may be disposed so that they are spaced around the rotation axis 18 from the brake pad 14B, the non-rotational engagement member 34B and the piston 42B, respectively. In that configuration, preferably, a plurality of combinations of the members be equally spaced around the rotation axis 18.

In the above-described embodiments, while the brake pads 14A, 14B, the non-rotational engagement members 34A, 34B and the pistons 42A, 42B have the same diameters to each other, they may have different diameters from each other.

In the above-described first and third embodiments, the frictional portions 14AA to 14BB formed on both sides of the brake pads 14A and 14B are provided at the same radial positions to each other from the autorotation axis 40 as a center. However, the frictional portions formed on both sides of the brake pads 14A and 14B may be provided at different radial positions from each other.

In the above-described embodiments, the brake pads 14A and 14B are provided with the shaft parts and the non-rotational engagement members 34A and 34B rotatably support the shaft parts. However, the non-rotational engagement members 34A and 34B may be provided with shaft parts and the brake pads 14A and 14B may rotatably be supported by the shaft parts.

In the above-described first and second embodiments, the cylindrical part 20B is integrally formed to the disk part 20A so as to form the main rotor 20. However, the cylindrical part 20B may integrally be formed to the subsidiary rotor 22 and, alternatively, the disk part 20A, the disk part 20A and the subsidiary rotor 22 may be separate members.

In the above-described second embodiment, the main rotor 20 and the subsidiary rotor 22 do not cooperate with the rotating shaft 16, the wheel carrier member 28 and the stationary member 38 to define a closed space, they may define a closed space. In that case, the closed space may be filled with a lubricant.

While in the above-described embodiments, the pressing devices are hydraulic devices in which pistons mate with the cylinder bores to define cylinder chambers, they may be electromagnetic actuators. In addition, while in the above-described embodiments, the brake device is one for a vehicle, the brake device according to the present invention may be applied to any application other than a vehicle.

The invention claimed is:

1. A friction brake device comprising:
a brake rotor which includes first and second disk parts spaced apart along a rotation axis and extending around said rotation axis over the entire circumference and a connection part integrally connecting the outer peripheral portions of said first and second disk parts;
first and second rotating friction members which are supported between said first and second disk parts by a stationary member so that said rotating friction members can rotate about associated autorotation axes parallel to said rotation axis;
first and second rotational torque transmission mechanisms which mutually transmit rotational torques between said brake rotor and said first and second rotating friction members without depending on the friction forces between said brake rotor and said first and second rotating friction members; and
first and second pressing devices which are supported between said first and second disk parts by said stationary member and press said first and second rotating friction members against first and second mutually opposed friction surfaces of said first and second disk parts, respectively.

2. The friction brake device according to claim 1, wherein said first and second pressing devices press said first and second rotating friction members against said first and second friction surfaces by way of first and second non-rotating friction members, respectively, which are supported non-rotatably around said rotation axis, and said first and second rotating friction members frictionally engage with said first and second friction surfaces, respectively, on one side and frictionally engage with said first and second non-rotating friction members, respectively, on the other side.

3. The friction brake device according to claim 1, wherein said connection part is higher in rigidity than said first and second disk parts.

4. The friction brake device according to claim 1, wherein said connection part is formed integrally with one of said first and second disk parts, and the other of said first and second disk parts is integrally coupled to said connection part by a coupling device which can release the coupling.

5. The friction brake device according to claim 1, wherein said first and second pressing devices include a cylinder bore formed in said stationary member and extending in a direction across said first and second disk parts and first and second pistons mating with said cylinder bore, and said first and second pistons cooperate with said cylinder bore to define a common cylinder chamber.

6. The friction brake device according to claim 2, wherein said brake rotor cooperates with said stationary member to define a closed space which accommodates said first and second rotating friction members, said first and second pressing devices and said first and second non-rotating friction members.

7. The friction brake device according to claim 6, wherein said closed space is filled with a lubricant.

8. The friction brake device according to claim 2, wherein said connection part is higher in rigidity than said first and second disk parts.

9. The friction brake device according to claim 2, wherein said connection part is formed integrally with one of said first and second disk parts, and the other of said first and second disk parts is integrally coupled to said connection part by a coupling device which can release the coupling.

10. The friction brake device according to claim 2, wherein said first and second pressing devices include a cylinder bore formed in said stationary member and extending in a direction across said first and second disk parts and first and second pistons mating with said cylinder bore, and said first and second pistons cooperate with said cylinder bore to define a common cylinder chamber.

11. The friction brake device according to claim 2, wherein said brake rotor cooperates with said stationary member to define a closed space which accommodates said first and second rotating friction members, said first and second pressing devices and said first and second non-rotating friction members.

* * * * *